United States Patent
Ryu et al.

(10) Patent No.: US 12,047,792 B2
(45) Date of Patent: Jul. 23, 2024

(54) INDICATING USER EQUIPMENT CAPABILITY FOR CHANNEL STATE INFORMATION MEASUREMENT

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/157,664

(22) Filed: Jan. 25, 2021

(65) Prior Publication Data

US 2021/0243626 A1 Aug. 5, 2021

Related U.S. Application Data

(60) Provisional application No. 62/968,944, filed on Jan. 31, 2020.

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04L 5/0048* (2013.01); *H04W 72/044* (2013.01)

(58) Field of Classification Search
None
See application file for complete search history.

(56) References Cited

U.S. PATENT DOCUMENTS

2019/0158155 A1* 5/2019 Park ................. H04L 5/0057
2019/0200214 A1* 6/2019 Liu ................... H04W 68/005
(Continued)

FOREIGN PATENT DOCUMENTS

EP      3796570 A1    3/2021
EP      3796570 A1    3/2021
(Continued)

OTHER PUBLICATIONS

Author Unknown, On support of advanced CSI, pp. 1-3 (Year: 2018).*

(Continued)

*Primary Examiner* — Christopher M Crutchfield
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a quantity of reference signals that the UE supports for measuring CSI within one or more slots. A base station may determine a quantity of reference signals to transmit to the UE for CSI measurement based at least in part on the indication. The UE may receive, and the base station may transmit, one or more reference signals in a slot of the one or more slots based at least in part on transmitting the indication of the quantity of reference signals, and may transmit an indication of one or more measurements of the received one or more reference signals. Numerous other aspects are described.

30 Claims, 8 Drawing Sheets

(51) Int. Cl.
H04L 5/00 (2006.01)
H04W 72/044 (2023.01)

(56) References Cited

U.S. PATENT DOCUMENTS

| | | | |
|---|---|---|---|
| 2019/0306924 A1 | 10/2019 | Zhang et al. | |
| 2019/0394710 A1* | 12/2019 | Ugurlu | H04L 5/0098 |
| 2021/0144569 A1* | 5/2021 | Zhou | H04B 17/336 |
| 2021/0227409 A1* | 7/2021 | Siomina | H04B 7/0617 |
| 2021/0243075 A1* | 8/2021 | Ryu | H04W 24/08 |
| 2021/0243761 A1* | 8/2021 | Yoshioka | H04B 7/0626 |
| 2022/0167426 A1* | 5/2022 | Cirik | H04W 72/04 |

FOREIGN PATENT DOCUMENTS

| | | |
|---|---|---|
| WO | 2019220649 A1 | 11/2019 |
| WO | WO-2019220649 A1 | 11/2019 |

OTHER PUBLICATIONS

Author Unknown, On support of advanced CSI, pp. 1-2 (Year: 2018).*
Author Unknown, Additional UE capabilities for advanced CSI in FD-MIMO, pp. 1-2 (Year: 2018).*
Author Unknown, UE capability on number of antenna ports for advanced CSI, pp. 1-5 (Year: 2018).*
Author Unknown, UE capability on number of antenna ports for advanced CSI, pp. 1-6 (Year: 2018).*
Author Unknown, Update of UE Capabilities, Doc. No. RP-182744, pp. 1-30, Dec. 13 (Year: 2018).*
Ericsson: "Enhancements to Radio Link Failure Reporting in NR", 3GPP Draft, 3GPP TSG-RAN WG2 #105, R3-190833 MRO Enhancements in NR, 3rd Generation Partnership Project (3GPP), Mobile Competence Centre, 650, Route Des Lucioles, F-06921 Sophia-Antipolis Cedex, France, vol. RAN WG2. No. Athens, Greece, Feb. 25, 2019-Mar. 1, 2019 Feb. 16, 2019 (Feb. 16, 2019), XP051604767, pp. 1-6, Retrieved from the Internet: URL:http://www.3gpp.org/ftp/tsg%5Fran/WG3%5Flu/TSGR3%5F103/Docs/R3%2D190833%2Ezip [retrieved on Feb. 16, 2019].
International Search Report and Written Opinion—PCT/US2021/015096—ISA/EPO—May 11, 2021.
Ericsson: "Enhancements to Radio Link Failure Reporting in NR", 3GPP Draft, 3GPP TSG-RAN WG2 #105, R3-190833 MRO Enhancements in NR, 3rd Generation Partnership Project (3GPP), Mobile Competence Centre, 650, Route Des Lucioles, F-06921 Sophia-Antipolis Cedex, France, vol. RAN WG2. No. Athens. Greece, Feb. 25, 2019-Mar. 1, 2019 Feb. 16, 2019 (Feb. 16, 2019), XP051604767, pp. 1-6, Retrieved from the Internet: URL:http://www.3gpp.org/ftp/tsg%5Fran/WG3%5Flu/TSGR3%5F103/Docs/R3%2D190833%2Ezip [retrieved on Feb. 16, 2019] the whole document.

* cited by examiner

INDICATING USER EQUIPMENT CAPABILITY FOR CHANNEL STATE INFORMATION MEASUREMENT

CROSS-REFERENCE TO RELATED APPLICATION

This Patent Application claims priority to Provisional Patent Application No. 62/968,944, filed on Jan. 31, 2020, entitled "INDICATING USER EQUIPMENT CAPABILITY FOR CHANNEL STATE INFORMATION MEASUREMENT," and assigned to the assignee hereof. The disclosure of the prior Application is considered part of and is incorporated by reference in this Patent Application.

FIELD OF THE DISCLOSURE

Aspects of the present disclosure generally relate to wireless communication and specifically, to techniques and apparatuses for indicating user equipment capability for channel state information measurement.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A base station may transmit one or more reference signals to a UE. The UE may attempt to detect and measure the reference signals to determine a metric associated with a wireless connection with the base station. For example, the UE may measure a layer 1 signal-to-interference-plus-noise ratio, or a layer 1 reference signal received power. The UE may transmit, to the base station, an indication of measurements of the reference signals. The base station may use the indication of measurements to configure subsequent communications between the UE and the base station. For example, the base station may perform a beam selection process or a beam refinement process based at least in part on the indication of measurements.

SUMMARY

In some aspects, a method of wireless communication performed by a user equipment (UE) includes transmitting an indication of a quantity of reference signals that the UE supports for measuring channel state information (CSI) within one or more slots; receiving one or more reference signals in a slot of the one or more slots based at least in part on transmitting the indication of the quantity of reference signals, and transmitting an indication of one or more measurements of the received one or more reference signals.

In some aspects, a method of wireless communication performed by a base station includes receiving an indication of a quantity of reference signals that the UE supports for measuring CSI within one or more slots; transmitting one or more reference signals in a slot of the one or more slots based at least in part on transmitting the indication of the quantity of reference signals, and receiving an indication of one or more measurements of the received one or more reference signals.

In some aspects, a UE for wireless communication includes a memory and one or more processors operatively coupled to the memory, the memory and the one or more processors configured to: transmit an indication of a quantity of reference signals that the UE supports for measuring CSI within one or more slots; receive one or more reference signals in a slot of the one or more slots based at least in part on transmitting the indication of the quantity of reference signals, and transmit an indication of one or more measurements of the received one or more reference signals.

In some aspects, a base station for wireless communication includes a memory and one or more processors operatively coupled to the memory, the memory and the one or more processors configured to: receive an indication of a quantity of reference signals that the UE supports for measuring CSI within one or more slots; transmit one or more reference signals in a slot of the one or more slots based at least in part on transmitting the indication of the quantity of reference signals, and receive an indication of one or more measurements of the received one or more reference signals.

In some aspects, a non-transitory computer-readable medium storing a set of instructions for wireless communication includes one or more instructions that, when executed by one or more processors of a UE, cause the UE to: transmit an indication of a quantity of reference signals that the UE supports for measuring CSI within one or more slots; receive one or more reference signals in a slot of the one or more slots based at least in part on transmitting the indication of the quantity of reference signals, and transmit an indication of one or more measurements of the received one or more reference signals.

In some aspects, a non-transitory computer-readable medium storing a set of instructions for wireless communication includes one or more instructions that, when executed by one or more processors of a base station, cause the base station to: receive an indication of a quantity of reference signals that the UE supports for measuring CSI within one or more slots; transmit one or more reference signals in a slot of the one or more slots based at least in part on transmitting the indication of the quantity of reference signals, and receive an indication of one or more measurements of the received one or more reference signals.

In some aspects, an apparatus for wireless communication includes means for transmitting an indication of a quantity of reference signals that the UE supports for measuring CSI within one or more slots; means for measuring one or more reference signals in a slot of the one or more slots based at least in part on transmitting the indication of the quantity of reference signals, and means for transmitting an indication of one or more measurements of the received one or more reference signals.

In some aspects, an apparatus for wireless communication includes means for receiving an indication of a quantity of reference signals that a UE supports for CSI measurement; means for transmitting one or more reference signals in a slot of the one or more slots based at least in part on transmitting the indication of the quantity of reference signals, and means for receiving an indication of one or more measurements of the received one or more reference signals.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
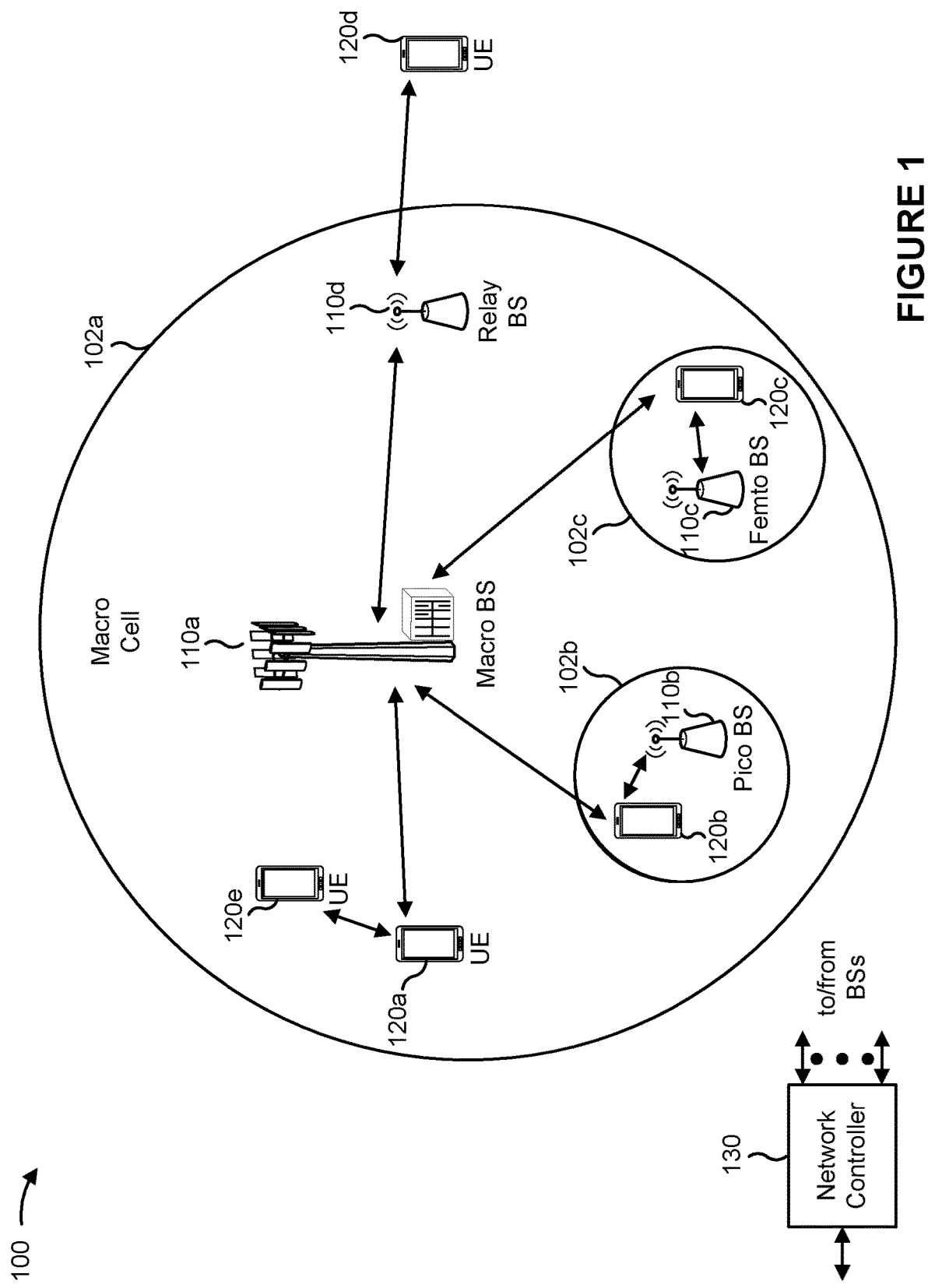
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a UE transmitting, and a base station receiving, an indication of a quantity of reference signals that the UE supports for channel state information (CSI) measurement. Some aspects more specifically relate to the UE transmitting an indication of a quantity of reference signals, across all component carriers (for example, of an associated wireless connection), that the UE supports for CSI measurement (for example, for a beam management procedure). In some aspects, the UE may transmit an indication of a quantity of reference signals supported across all component carriers per frequency range (for example, frequency range 1 (FR1) or frequency range 2 (FR2), among other examples) or an indication of a quantity of reference signals supported across all component carriers (for example, a total number of component carriers supported in all frequency ranges). In some aspects, the component carriers may include a special cell (SPCell) and one or more secondary cells (SCells). In some aspects, a numerology or a subcarrier spacing (SCS) of a slot, a sub-slot, a set of slots, or another time domain resource during which the UE supports the quantity of reference signals may be associated with a numerology or an SCS of a downlink bandwidth part of a component carrier of the wireless connection. For example, the numerology may be a smallest numerology of all component carriers of the wireless connection or the SCS may be a largest subcarrier spacing of all component carriers of the wireless connection. In some aspects, a numerology or an SCS of a slot, a sub-slot, a set of slots, or another time domain resource during which the UE supports the quantity of reference signals may be associated with a reference numerology or SCS (for example, a configured numerology or SCS).

Particular aspects of the subject matter described in this disclosure can be implemented to realize one or more of the following potential advantages. In some examples, the described techniques can be used by a base station to configure a quantity of reference signals used to perform CSI measurement, with the quantity based at least in part on a number of reference signals supported by the UE. In this way, the base station may conserve power, computing, communication, or network resources that may otherwise have been consumed by transmitting a quantity of reference signals for CSI measurement that is greater than the quantity of reference signals supported by the UE. Additionally or alternatively, the base station may transmit an increased quantity of reference signals, based at least in part on the UE supporting the increased quantity of reference signals, which may improve a beam management procedure (for example, allow for testing an increased quantity of candidate beams) or may reduce an amount of time resources to be used to transmit the reference signals.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
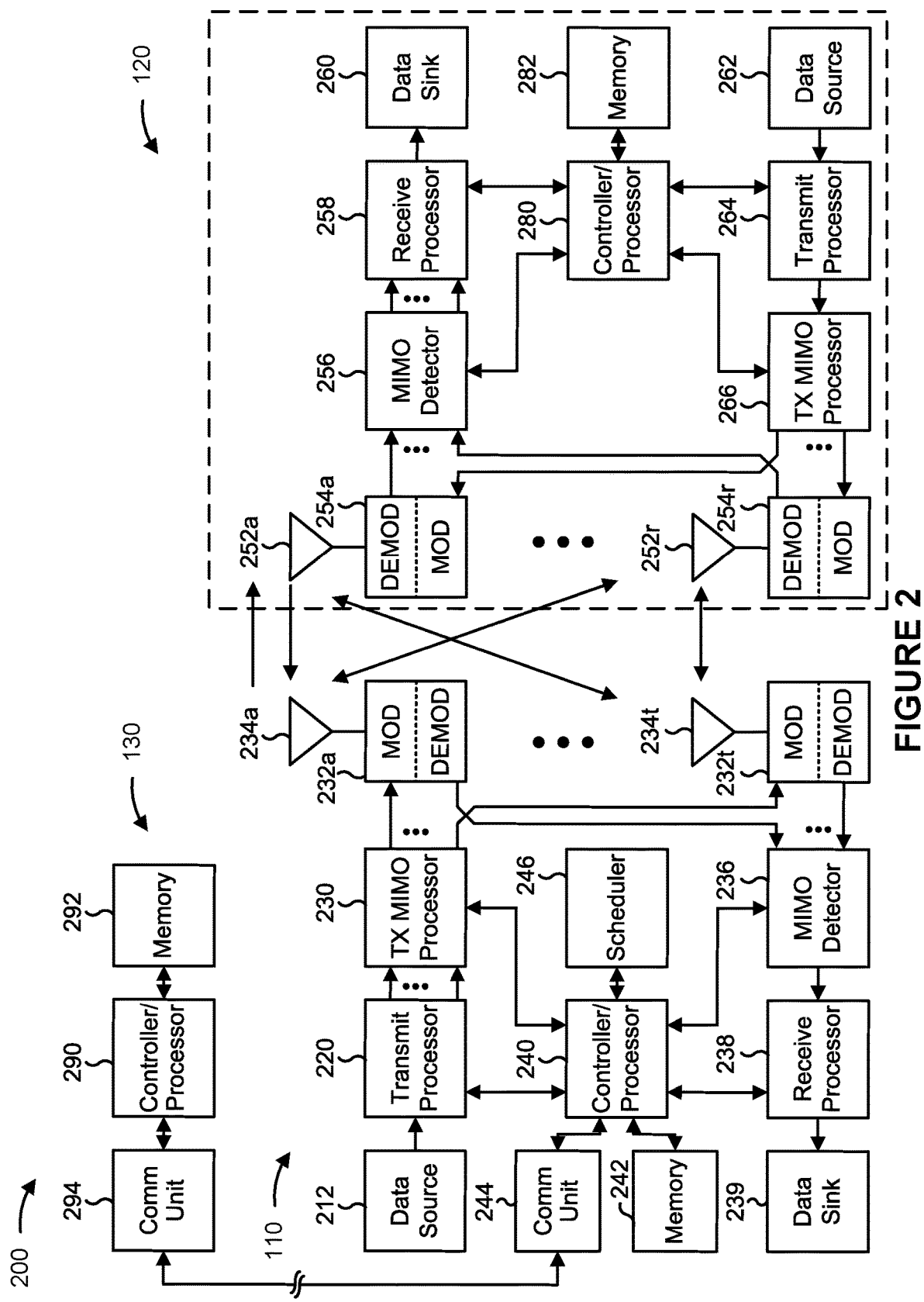
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with indicating user equipment capability for channel state information measurement, as described in more detail elsewhere herein. For example, controller/processor 240 of base station 110, controller/processor 280 of UE 120, or any other component(s) of FIG. 2 may perform or direct operations of, for example, process 500 of FIG. 5, process 600 of FIG. 6, or other processes as described herein. Memories 242 and 282 may store data and program codes for base station 110 and UE 120, respectively. In some aspects, memory 242 and memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, or other processes as described herein. In some aspects, executing instructions may include running the instructions, converting the instructions, compiling the instructions, or interpreting the instructions, among other examples.

In some aspects, the UE includes means for transmitting an indication of a quantity of reference signals that the UE supports for measuring CSI within one or more slots; means for measuring one or more reference signals in a slot of the one or more slots based at least in part on transmitting the indication of the quantity of reference signals, and/or means for transmitting an indication of one or more measurements of the received one or more reference signals. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining the quantity of reference signals that the UE supports for measuring CSI within one or more slots based at least in part on one or more of a configuration of the UE, components of the UE, or an operation mode of the UE.

In some aspects, the base station includes means for measuring an indication of a quantity of reference signals that the UE supports, for measuring within a slot, for CSI measurement; means for transmitting one or more reference signals in a slot of the one or more slots based at least in part on transmitting the indication of the quantity of reference signals, and means for measuring an indication of one or more measurements of the received one or more reference signals. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining a quantity of reference signals to transmit to the UE, for measuring within a slot, CSI measurement based at least in part on the indication.

Figure 3:
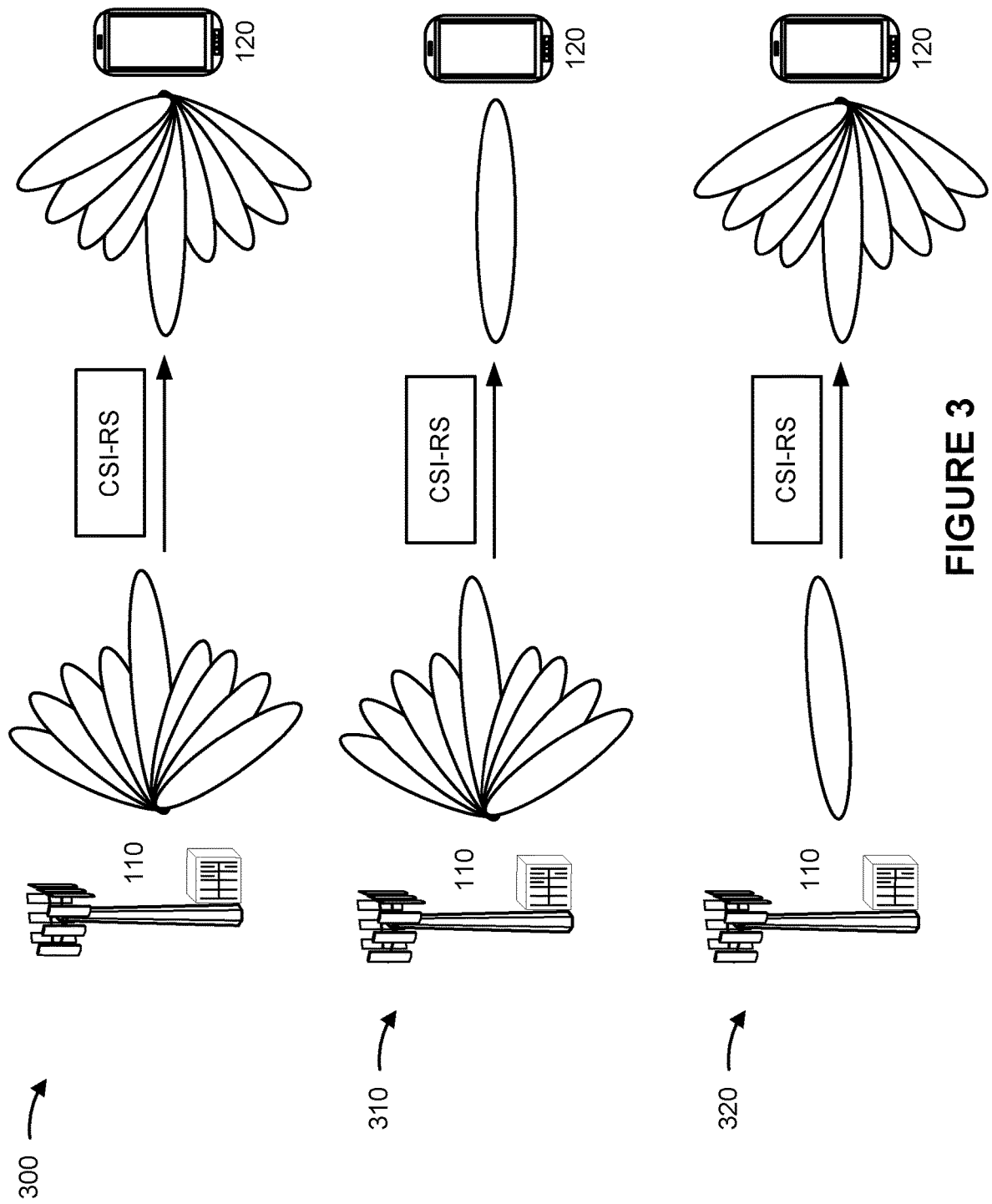
FIG. 3 is a diagram illustrating examples of channel state information (CSI) measurement beam management procedures, in accordance with the present disclosure.

FIG. 3 is a diagram illustrating examples 300, 310, and 320 of CSI reference signal (CSI-RS) beam management procedures, in accordance with the present disclosure. As shown in FIG. 3, examples 300, 310, and 320 include a UE 120 in communication with a base station 110 in a wireless network (for example, wireless network 100). However, the devices shown in FIG. 3 are provided as examples, and the wireless network may support communication and beam management between other devices (for example, between a UE 120 and a base station 110 or transmit receive point (TRP), between a mobile termination node and a control node, between an integrated access and backhaul (IAB) child node and an IAB parent node, or between a scheduled node and a scheduling node). In some aspects, the UE 120 and the base station 110 may be in a connected state (for example, an RRC connected state).

As shown in FIG. 3, example 300 may include a base station 110 and a UE 120 communicating to perform beam management using CSI-RSs. Example 300 depicts a first beam management procedure (for example, P1 CSI-RS beam management). The first beam management procedure may be referred to as a beam selection procedure, an initial beam acquisition procedure, a beam sweeping procedure, a cell search procedure, or a beam search procedure. As shown in FIG. 3 and example 300, CSI-RSs may be configured to be transmitted from the base station 110 to the UE 120. The CSI-RSs may be configured to be periodic (for example, using RRC signaling), semi-persistent (for example, using media access control (MAC) control element (MAC-CE) signaling), or aperiodic (for example, using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (for example, with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management procedure may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (for example, P2 CSI-RS beam management). The second beam management procedure may be referred to as a beam refinement procedure, a base station beam refinement procedure, a TRP beam refinement procedure, or a transmit beam refinement procedure. As shown in FIG. 3 and example 310, CSI-RSs may be configured to be transmitted from the base station 110 to the UE 120. The CSI-RSs may be configured to be aperiodic (for example, using DCI). The second beam management procedure may include the base station 110 performing beam sweeping over one or more transmit beams. The one or more transmit beams may be a subset of all transmit beams associated with the base station 110 (for example, determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (for example, a same) receive beam (for example, determined based at least in part on measurements performed in connection with the first beam management procedure). The second beam management procedure may enable the base station 110 to select a best transmit beam based at least in part on measurements of the CSI-RSs (for example, measured by the UE 120 using the single receive beam) reported by the UE 120.

As shown in FIG. 3, example 320 depicts a third beam management procedure (for example, P3 CSI-RS beam management). The third beam management procedure may be referred to as a beam refinement procedure, a UE beam refinement procedure, or a receive beam refinement procedure. As shown in FIG. 3 and example 320, one or more CSI-RSs may be configured to be transmitted from the base station 110 to the UE 120. The CSI-RSs may be configured to be aperiodic (for example, using DCI). The third beam management procedure may include the base station 110 transmitting the one or more CSI-RSs using a single transmit beam (for example, determined based at least in part on measurements reported by the UE 120 in connection with the first beam management procedure or the second beam management procedure). To enable the UE 120 to perform receive beam sweeping, the base station may use a transmit beam to transmit (for example, with repetitions) CSI-RS at multiple times within the same RS resource set so that UE 120 can sweep through one or more receive beams in multiple transmission instances. The one or more receive beams may be a subset of all receive beams associated with the UE 120 (for example, determined based at least in part on measurements performed in connection with the first beam management procedure or the second beam management procedure). The third beam management procedure may enable the base station 110 or the UE 120 to select a best receive beam based at least in part on reported measurements received from the UE 120 (for example, of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, or the UE 120 and the base station 110 may perform a similar beam management procedure to select a UE transmit beam.

In some networks, a base station and a UE may perform one or more procedures including transmission of reference signals, measurement of the reference signals, and/or transmission of an indication of measurements of the reference signals. For example, the base station and the UE may perform one or more beam management procedures (for example, as shown in FIG. 3). As part of the one or more procedures, the base station may transmit one or more reference signals to a UE for CSI measurement (for example, for a beam management procedure). The UE may attempt to detect and measure the reference signals to determine a metric associated with a wireless connection with the base station. For example, the UE may measure a layer 1 signal-to-interference-plus-noise ratio, or a layer 1 reference signal received power (for example, as part of a beam management procedure). The UE may transmit, to a base station, an indication of measurements of the reference signals. The base station may use the indication of measurements to configure subsequent communications between the UE and the base station. For example, the base station may perform a beam selection process or a beam refinement process based at least in part on the indication of measurements. However, the base station may unnecessarily consume power, computing, communication, or network resources based at least in part on transmitting a quantity of reference signals for CSI measurement that is greater than a quantity of reference signals supported by the UE. Additionally or alternatively, the base station may transmit fewer CSI reference signals than the UE supports, which may degrade a beam management procedure (for example, allow for testing of a decreased quantity of candidate beams) or may increase an amount of time resources required to transmit the reference signals.

In some aspects described herein, a UE may transmit an indication of a quantity of reference signals that the UE supports (for example, for receipt during a time domain resource) for CSI measurement. The UE may communicate via the wireless connection based at least in part on the indication. For example, the UE may receive a quantity of reference signals (for example, in a slot), for CSI measurement, with the quantity of received reference signals being less than or equal to the indicated quantity of reference signals that the UE supports for measuring CSI within one or more slots. The UE may use the quantity of reference signals for CSI measurement and may transmit an indication of CSI measurements. In this way, the base station may conserve power, computing, communication, or network resources that may otherwise have been consumed by transmitting a quantity of reference signals for CSI measurement that is greater than the quantity of reference signals supported by the UE. Additionally or alternatively, the base station may transmit an increased quantity of reference signals, based at least in part on the UE supporting the increased quantity of reference signals, which may improve a beam management procedure (for example, allow for testing an increased quantity of candidate beams) or may reduce an amount of time resources required to transmit the reference signals.

Figure 4:
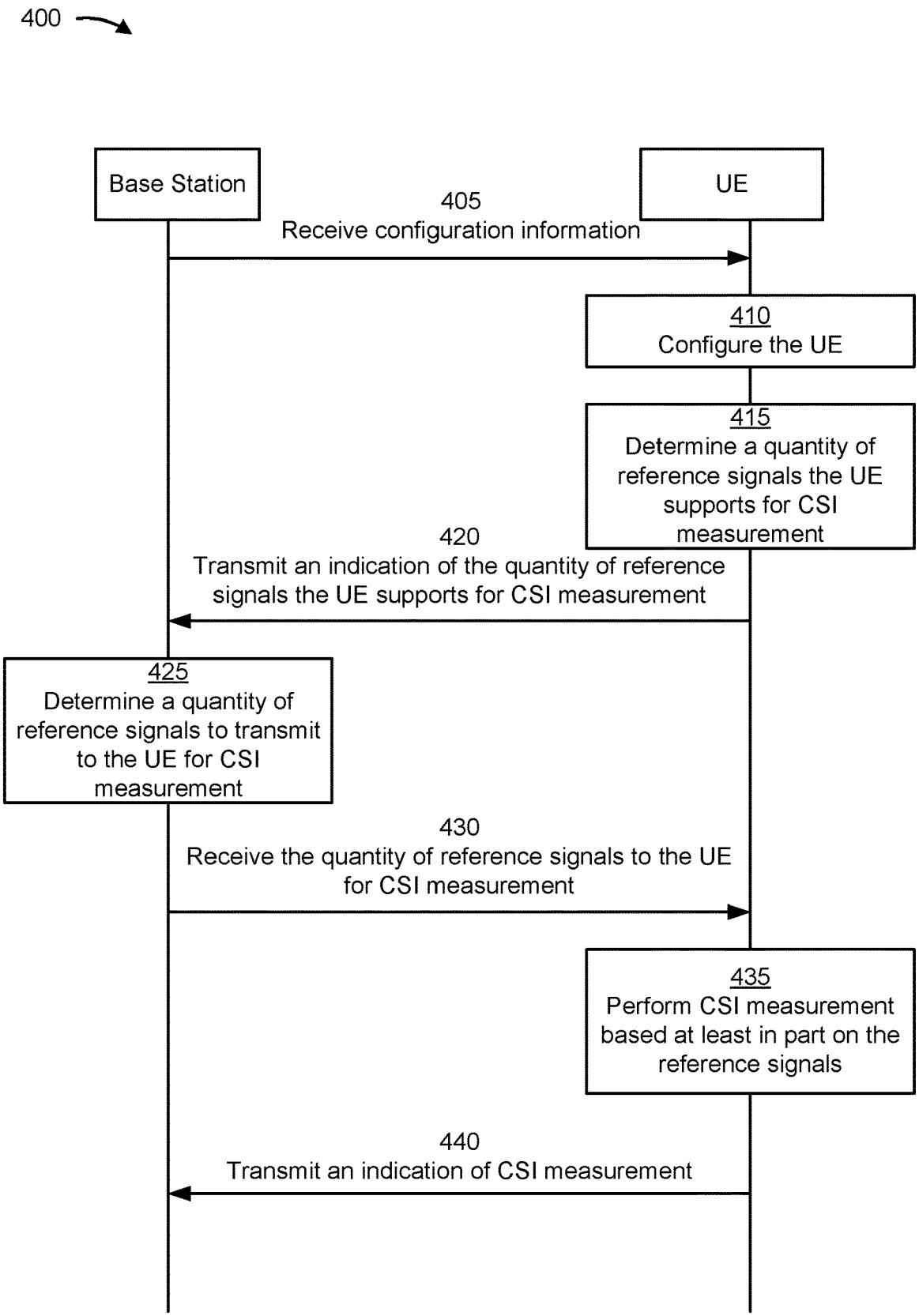
FIG. 4 is a diagram illustrating an example of indicating UE capability for CSI measurement, in accordance with the present disclosure.

FIG. 4 is a diagram illustrating an example 400 of indicating user equipment capability for CSI measurement, in accordance with the present disclosure. As shown in FIG. 4, a UE (for example, UE 120) may communicate with a base station (for example, base station 110). In some aspects, the UE and the base station may be part of a wireless network (for example, wireless network 100).

In a first operation 405, the UE may receive configuration information (for example, from a base station) or determine the configuration information based at least in part on a communication standard. In some aspects, the UE may receive the configuration information via one or more of a system information block, radio resource control (RRC) signaling, medium access control control elements (MAC CEs), or a sidelink communication, among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to determine a quantity of reference signals that the UE supports for measuring CSI within one or more slots. In some aspects, the configuration information may indicate how the UE is to determine the quantity of reference signals that the UE supports for measuring CSI within one or more slots. In some aspects, the configuration information may indicate that the UE is to transmit an indication of the quantity of reference signals that the UE supports for measuring CSI within one or more slots. In some aspects, the configuration information may indicate how (for example, a configuration indicating how) the UE is to transmit the indication of the quantity of reference signals that the UE supports for measuring CSI within one or more slots.

In a second operation 410, the UE may be configured based at least in part on the configuration information. In some aspects, the UE may be configured to perform one or more operations described herein.

In a third operation 415, the UE may determine the quantity of reference signals that the UE supports for measuring CSI within one or more slots. In some aspects, the quantity is based at least in part on a configuration of the UE (for example, a power state of the UE), components of the UE (for example, a quantity of baseband components, a quantity of antenna groups, or computing components, among other examples), or an operation mode of the UE (for example, a dual connectivity mode). In some aspects, the configuration of the UE may be based at least in part on the configuration information received, for example, from the base station.

In some aspects, the quantity of reference signals that the UE supports for measuring CSI within one or more slots may include a maximum quantity of reference signals that the UE supports for measuring CSI within one or more slots. In some aspects, the quantity of reference signals that the UE supports for measuring CSI within one or more slots may include a selected quantity, that is less than or equal to the maximum quantity, of reference signals that the UE supports for CSI measurement.

In some aspects, the quantity of reference signals that the UE supports for measuring CSI within one or more slots may include a quantity of reference signals that the UE supports for measuring CSI within one or more slots on a first set of component carriers of a first frequency range or a quantity of reference signals that the UE supports for measuring CSI within one or more slots on a second set of component carriers of a second frequency range (for example, separate quantities per frequency range). The first set of component carriers of the first frequency range may include a special cell and one or more secondary cells of the first frequency range. The second set of component carriers of the second frequency range may include a special cell and one or more secondary cells of the second frequency range.

In some aspects, the quantity of reference signals that the UE supports for measuring CSI within one or more slots may include a quantity of reference signals that the UE supports for measuring CSI within one or more slots on a set of component carriers of multiple frequency ranges. For example, the quantity of reference signals that the UE supports for measuring CSI within one or more slots may include a total quantity of reference signals that the UE supports for the first frequency range and the second frequency range (for example, a combined quantity for two or more frequency ranges). The set of component carriers of the multiple frequency ranges may include one or more special cells (for example, a special cell per frequency range) and one or more secondary cells of the multiple frequency ranges.

In some aspects, the quantity of reference signals that the UE supports for measuring CSI within one or more slots may include a quantity of reference signals that the UE supports for measuring CSI within one or more slots during a slot, a sub-slot, a set of slots, or another time-domain resource. A numerology of the time domain resource (for example, a slot) for measuring the reference signals may be based at least in part on a particular numerology of a particular bandwidth part of component carriers over which the UE supports the quantity of reference signals. In some aspects, the particular bandwidth part may be a bandwidth part having a smallest numerology among bandwidth parts of the component carriers over which the UE supports the quantity of reference signals. In some aspects, a numerology of a time domain resource for measuring the reference signals may be based at least in part on a configured numerology (for example, configured based at least in part on configuration information or a communication standard, among other examples). In some aspects, a subcarrier spacing of a time domain resource for measuring the reference signals is based at least in part on a particular subcarrier spacing of a particular bandwidth part of component carriers over which the UE supports the quantity of reference signals. In some aspects, the particular bandwidth part may be a bandwidth part having a largest subcarrier spacing among bandwidth parts of the component carriers over which the UE supports the quantity of reference signals. In some aspects, a subcarrier spacing of a time domain resource for measuring the reference signals is based at least in part on a configured subcarrier spacing (for example, configured based at least in part on configuration information or a communication standard, among other examples).

In a fourth operation 420, the UE may transmit, and the base station may receive, an indication of the quantity of reference signals that the UE supports for measuring CSI within one or more slots (for example, maxTotalResourcesForAcrossFreqRanges-r16 or maxTotalResourcesForOneFreqRange-r16). In some aspects, the indication may indicate a quantity of resources associated with the reference signals that the UE supports for CSI measurement (for example, for beam management). For example, the quantity of resources may be a quantity of resources across all component carriers in a single frequency range (for example, maxTotalResourcesForOneFreqRange-r16), or in all frequency ranges (for example, maxTotalResourcesForAcrossFreqRanges-r16), among other examples. In some aspects, the indication may indicate a quantity of reference signals that the UE supports for measuring CSI within one or more slots within a slot (for example, across all component carriers in a frequency range) (for example, maxNumberResWithinSlotAcrossCC-AcrossFR-r16 or maxNumberResWithinSlotAcrossCC-OneFR-r16). In some aspects, the UE may transmit the indication via a control message. For example, the UE may transmit the indication via a physical uplink control channel communication. In some aspects, the UE may communicate with the base station (for example, via an associated wireless connection) based at least in part on the indication of the quantity of reference signals that the UE supports for measuring CSI within one or more slots. For example, the UE may receive one or more reference signals for CSI measurement from the base station or may transmit an indication of CSI measurement.

In a fifth operation 425, the base station may determine a quantity of reference signals to transmit to the UE for CSI measurement. In some aspects, the quantity may be based in part on the indication of the quantity of reference signals that the UE supports for measuring CSI within one or more slots. For example, the quantity of reference signals to transmit to the UE may be a same quantity as, or a quantity that is less than, the quantity of reference signals that the UE supports for measuring CSI within one or more slots. In some aspects, the base station may determine to transmit a quantity that is less than the quantity of reference signals that the UE supports for measuring CSI within one or more slots based at least in part on, for example, a configured beam width for an associated cell, or channel condition metrics, among other examples.

In a sixth operation 430, the UE may receive, and the base station may transmit, the quantity of reference signals for CSI measurement (for example, within a slot). In some aspects, the reference signals may include synchronization signal physical broadcast channel blocks or channel state information reference signals (CSI-RSs). In some aspects, the CSI-RSs may include one or more non-zero-power (NZP) CSI-RSs, one or more aperiodic CSI-RSs, one or more periodic CSI-RSs, or one or more semi-persistent CSI-RSs.

In a seventh operation 435, the UE may perform CSI measurement. In some aspects, the UE may attempt to detect and measure the reference signals to determine a metric associated with a wireless connection with the base station. For example, the UE may measure a layer 1 signal-to-interference-plus-noise ratio, or a layer 1 reference signal received power.

In an eighth operation 440, the UE may transmit an indication of CSI measurement. For example, the UE may transmit the indication of CSI measurement via a secondary cell, a special cell, or a primary cell. In some aspects, the UE may transmit the indication of CSI measurement via a control message. The indication of CSI measurement may include a CSI measurement report, a CSI interference measurement report, or other report.

Based at least in part on the UE receiving a quantity of reference signals, for CSI measurement, with the quantity of received reference signals being less than or equal to the indicated quantity of reference signals that the UE supports for measuring CSI within one or more slots, the base station may conserve power, computing, communication, or network resources that may otherwise have been consumed by transmitting a quantity of reference signals for CSI measurement that is greater than the quantity of reference signals supported by the UE. Additionally or alternatively, the base station may transmit an increased quantity of reference signals, based at least in part on the UE supporting the increased quantity of reference signals, which may improve a beam management procedure (for example, allow for testing an increased quantity of candidate beams) or may reduce an amount of time resources required to transmit the reference signals.

Figure 5:
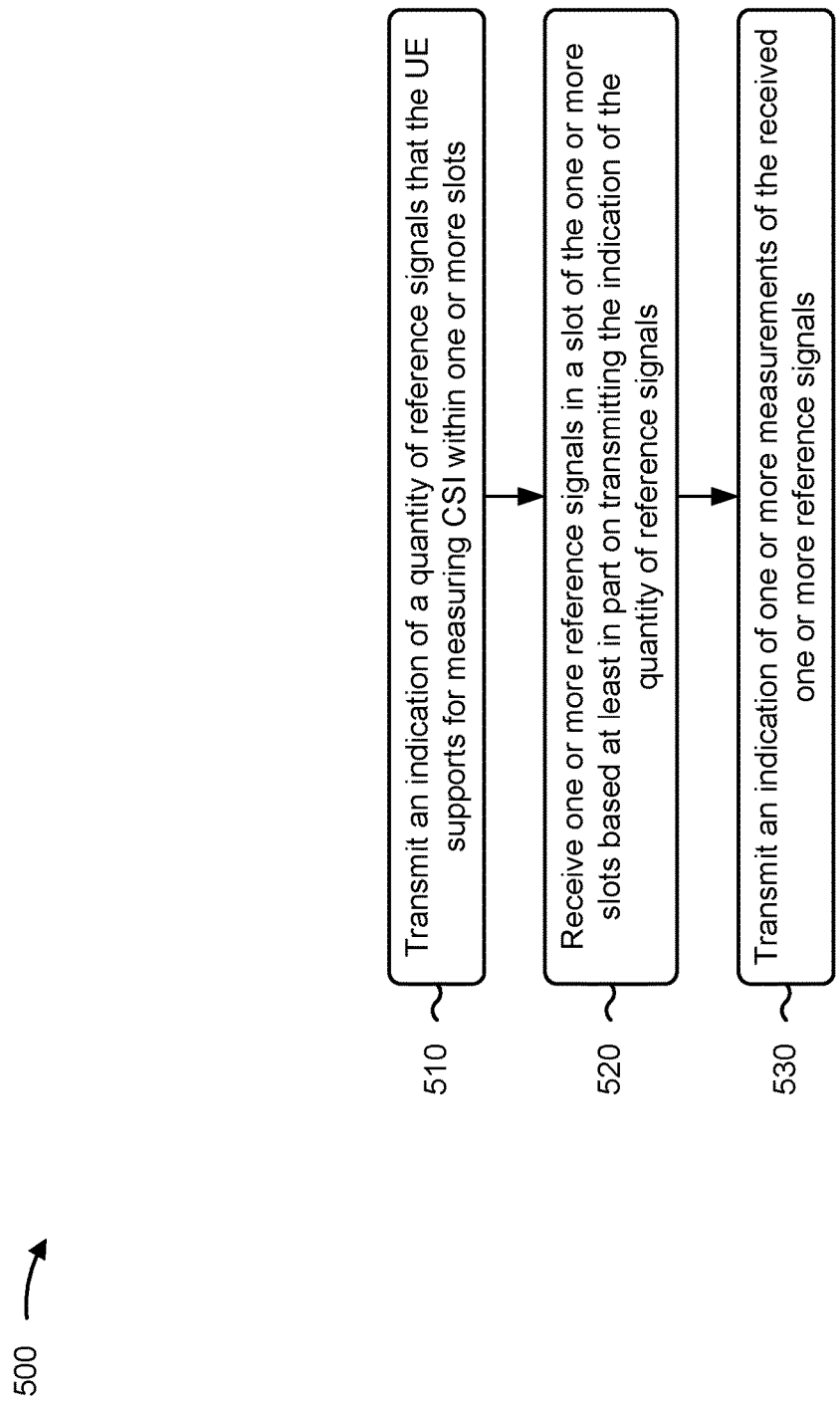
FIG. 5 is a flowchart illustrating an example process performed, for example, by a UE, in accordance with the present disclosure.

FIG. 5 is a flowchart illustrating an example process 500 performed, for example, by a UE in accordance with the present disclosure. Example process 500 is an example where the UE (for example, UE 120) performs operations associated with indicating user equipment capability for channel state information measurement.

As shown in FIG. 5, in some aspects, process 500 may include transmitting an indication of a quantity of reference signals that the UE supports for measuring CSI within one or more slots (block 510). For example, the UE (such as by using transmission component 706, depicted in FIG. 700) may transmit an indication of a quantity of reference signals that the UE supports for measuring CSI within one or more slots, as described above.

As further shown in FIG. 5, in some aspects, process 500 may include receiving one or more reference signals in a slot of the one or more slots based at least in part on transmitting the indication of the quantity of reference signals (block 520). For example, the UE (such as by using reception component 702, depicted in FIG. 7) may receive one or more reference signals in a slot of the one or more slots based at least in part on transmitting the indication of the quantity of reference signals, as described above.

As further shown in FIG. 5, in some aspects, process 500 may include transmitting an indication of one or more measurements of the received one or more reference signals (block 530). For example, the UE (such as by using transmission component 706, depicted in FIG. 7) may transmit an indication of one or more measurements of the received one or more reference signals, as described above.

Process 500 may include additional aspects, such as any single aspect or any combination of aspects described below or in connection with one or more other processes described elsewhere herein.

In a first additional aspect, the quantity of reference signals that the UE supports for measuring CSI within one or more slots comprises a maximum quantity of reference signals that the UE supports for measuring CSI within one or more slots.

In a second additional aspect, alone or in combination with the first aspect, the one or more measurements comprise one or more measurements of one or more of a layer 1 signal-to-interference-plus-noise ratio, or a layer 1 reference signal received power.

In a third additional aspect, alone or in combination with one or more of the first and second aspects, the one or more reference signals include one or more of synchronization signal physical broadcast channel blocks or channel state information reference signals.

In a fourth additional aspect, alone or in combination with one or more of the first through third aspects, the channel state information reference signals comprise one or more of a non-zero-power channel state information reference signal, an aperiodic channel state information reference signal, a periodic channel state information reference signal, or a semi-persistent channel state information reference signal.

In a fifth additional aspect, alone or in combination with one or more of the first through fourth aspects, the reference signals that the UE supports for CSI measurement include reference signals that the UE supports for CSI measurement on a set of component carriers of a frequency range.

In a sixth additional aspect, alone or in combination with one or more of the first through fifth aspects, the quantity of reference signals that the UE supports for measuring CSI within one or more slots includes a quantity of reference signals that the UE supports for measuring CSI within one or more slots on a set of component carriers of multiple frequency ranges.

In a seventh additional aspect, alone or in combination with one or more of the first through sixth aspects, transmitting the indication of the quantity of reference signals that the UE supports for measuring CSI within one or more slots comprises transmitting the indication within a control message.

In an eighth additional aspect, alone or in combination with one or more of the first through seventh aspects, a numerology of the slot is based at least in part on a particular numerology of a particular bandwidth part of component carriers over which the UE supports the quantity of reference signals.

In a ninth additional aspect, alone or in combination with one or more of the first through eighth aspects, the particular bandwidth part is a bandwidth part having a smallest numerology among bandwidth parts of the component carriers over which the UE supports the quantity of reference signals.

In a tenth additional aspect, alone or in combination with one or more of the first through ninth aspects, a numerology of the slot is based at least in part on a configured numerology.

In an eleventh additional aspect, alone or in combination with one or more of the first through tenth aspects, a subcarrier spacing of a slot for measuring the reference signals is based at least in part on a particular subcarrier spacing of a particular bandwidth part of component carriers over which the UE supports the quantity of reference signals.

In a twelfth additional aspect, alone or in combination with one or more of the first through eleventh aspects, the particular bandwidth part is a bandwidth part having a largest subcarrier spacing among bandwidth parts of the component carriers over which the UE supports the quantity of reference signals.

In a thirteenth additional aspect, alone or in combination with one or more of the first through twelfth aspects, a subcarrier spacing of the slot is based at least in part on a configured subcarrier spacing.

In a fourteenth additional aspect, alone or in combination with one or more of the first through thirteenth aspects, process 500 includes determining the quantity of reference signals that the UE supports for measuring CSI within one or more slots based at least in part on one or more of a configuration of the UE, components of the UE, or an operation mode of the UE.

In a fifteenth additional aspect, alone or in combination with one or more of the first through fourteenth aspects, the quantity of reference signals that the UE supports for measuring CSI within one or more slots is based at least in part on one or more of a configuration of the UE, components of the UE, or an operation mode of the UE.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
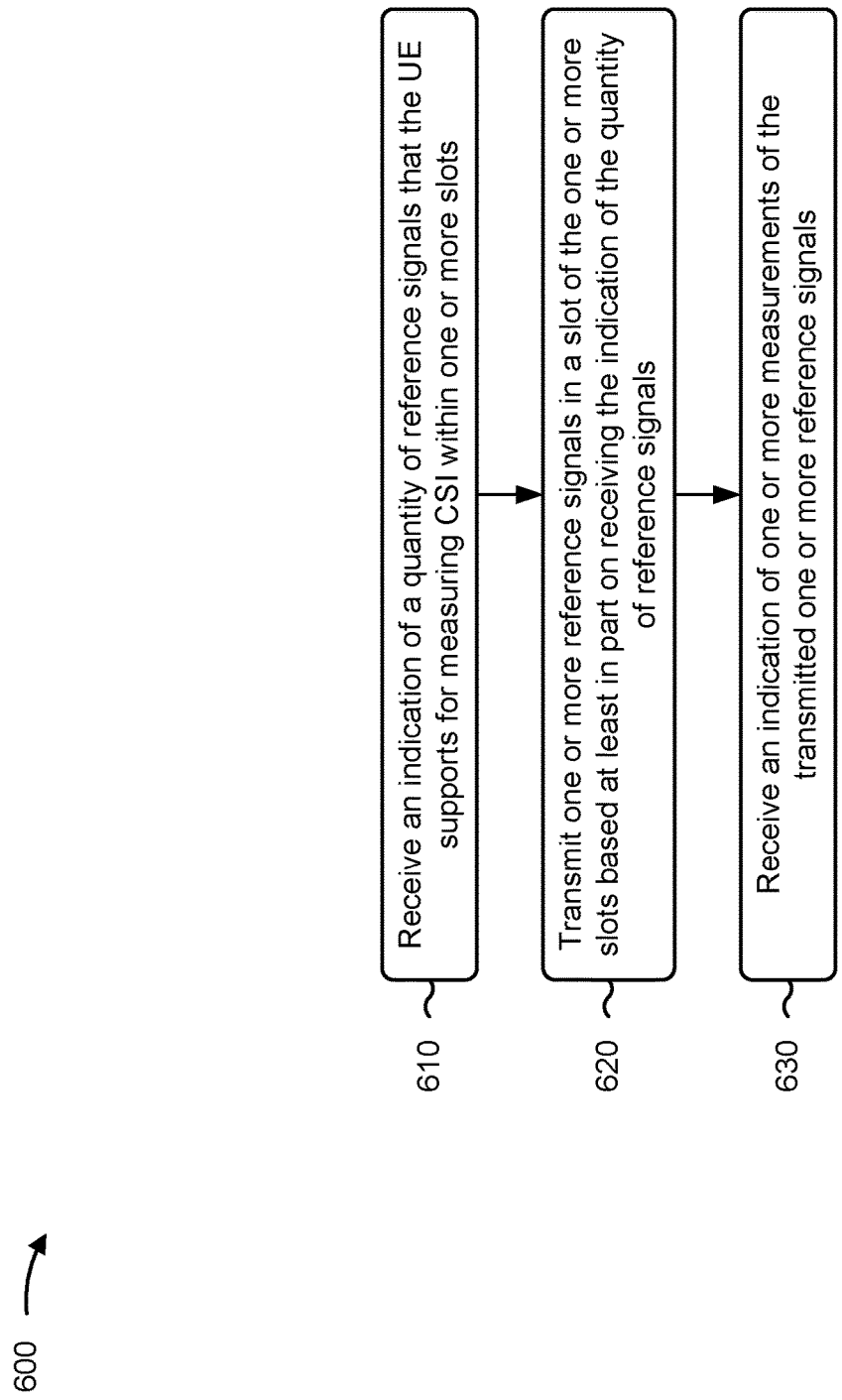
FIG. 6 is a flowchart illustrating an example process performed, for example, by a base station, in accordance with the present disclosure.

FIG. 6 is a flowchart illustrating an example process 600 performed, for example, by a base station in accordance with the present disclosure. Example process 600 is an example where the base station (for example, base station 110) performs operations associated with indicating user equipment capability for channel state information measurement.

As shown in FIG. 6, in some aspects, process 600 may include receiving an indication of a quantity of reference signals that the UE supports for measuring CSI within one or more slots (block 610). For example, the base station (such as by using reception component 802, depicted in FIG. 8) may receive an indication of a quantity of reference signals that the UE supports for measuring CSI within one or more slots, as described above.

As further shown in FIG. 6, in some aspects, process 600 may include transmitting one or more reference signals in a slot of the one or more slots based at least in part on transmitting the indication of the quantity of reference signals (block 620). For example, the base station (such as by using transmission component 806, depicted in FIG. 8) may transmit one or more reference signals in a slot of the one or more slots based at least in part on transmitting the indication of the quantity of reference signals, as described above.

As further shown in FIG. 6, in some aspects, process 600 may include receiving an indication of one or more measurements of the received one or more reference signals (block 630). For example, the base station (such as by using reception component 802, depicted in FIG. 8) may receive an indication of one or more measurements of the received one or more reference signals, as described above.

Process 600 may include additional aspects, such as any single aspect or any combination of aspects described below or in connection with one or more other processes described elsewhere herein.

In a first additional aspect, the quantity of reference signals that the UE supports for measuring CSI within one or more slots comprises a maximum quantity of reference signals that the UE supports for measuring CSI within one or more slots.

In a second additional aspect, alone or in combination with the first aspect, the one or more measurements comprise one or more measurements of one or more of a layer 1 signal-to-interference-plus-noise ratio, or a layer 1 reference signal received power.

In a third additional aspect, alone or in combination with one or more of the first and second aspects, the one or more reference signals include one or more of synchronization signal physical broadcast channel blocks or channel state information reference signals.

In a fourth additional aspect, alone or in combination with one or more of the first through third aspects, the channel state information reference signals comprise one or more of a non-zero-power channel state information reference signal, an aperiodic channel state information reference signal, a periodic channel state information reference signal, or a semi-persistent channel state information reference signal.

In a fifth additional aspect, alone or in combination with one or more of the first through fourth aspects, the reference signals that the UE supports for CSI measurement include reference signals that the UE supports for CSI measurement on a set of component carriers of a frequency range.

In a sixth additional aspect, alone or in combination with one or more of the first through fifth aspects, the quantity of reference signals that the UE supports for measuring CSI within one or more slots includes a quantity of reference signals that the UE supports for measuring CSI within one or more slots on a set of component carriers of multiple frequency ranges.

In a seventh additional aspect, alone or in combination with one or more of the first through sixth aspects, receiving the indication of the quantity of reference signals that the UE supports for measuring CSI within one or more slots comprises receiving the indication within a control message.

In an eighth additional aspect, alone or in combination with one or more of the first through seventh aspects, a numerology of the slot is based at least in part on a particular numerology of a particular bandwidth part of component carriers over which the UE supports the quantity of reference signals.

In a ninth additional aspect, alone or in combination with one or more of the first through eighth aspects, the particular bandwidth part is a bandwidth part having a smallest numerology among bandwidth parts of the component carriers over which the UE supports the quantity of reference signals.

In a tenth additional aspect, alone or in combination with one or more of the first through ninth aspects, a numerology of the slot is based at least in part on a configured numerology.

In an eleventh additional aspect, alone or in combination with one or more of the first through tenth aspects, a subcarrier spacing of the slot is based at least in part on a particular subcarrier spacing of a particular bandwidth part of component carriers over which the UE supports the quantity of reference signals.

In a twelfth additional aspect, alone or in combination with one or more of the first through eleventh aspects, the particular bandwidth part is a bandwidth part having a largest subcarrier spacing among bandwidth parts of the component carriers over which the UE supports the quantity of reference signals.

In a thirteenth additional aspect, alone or in combination with one or more of the first through twelfth aspects, a subcarrier spacing of the slot is based at least in part on a configured subcarrier spacing.

In a fourteenth additional aspect, alone or in combination with one or more of the first through thirteenth aspects, process 600 includes determining a quantity of reference signals to transmit to the UE for CSI measurement based at least in part on the indication.

In a fifteenth additional aspect, alone or in combination with one or more of the first through fourteenth aspects, the quantity of reference signals that the UE supports for measuring CSI within one or more slots is based at least in part on one or more of a configuration of the UE, components of the UE, or an operation mode of the UE.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
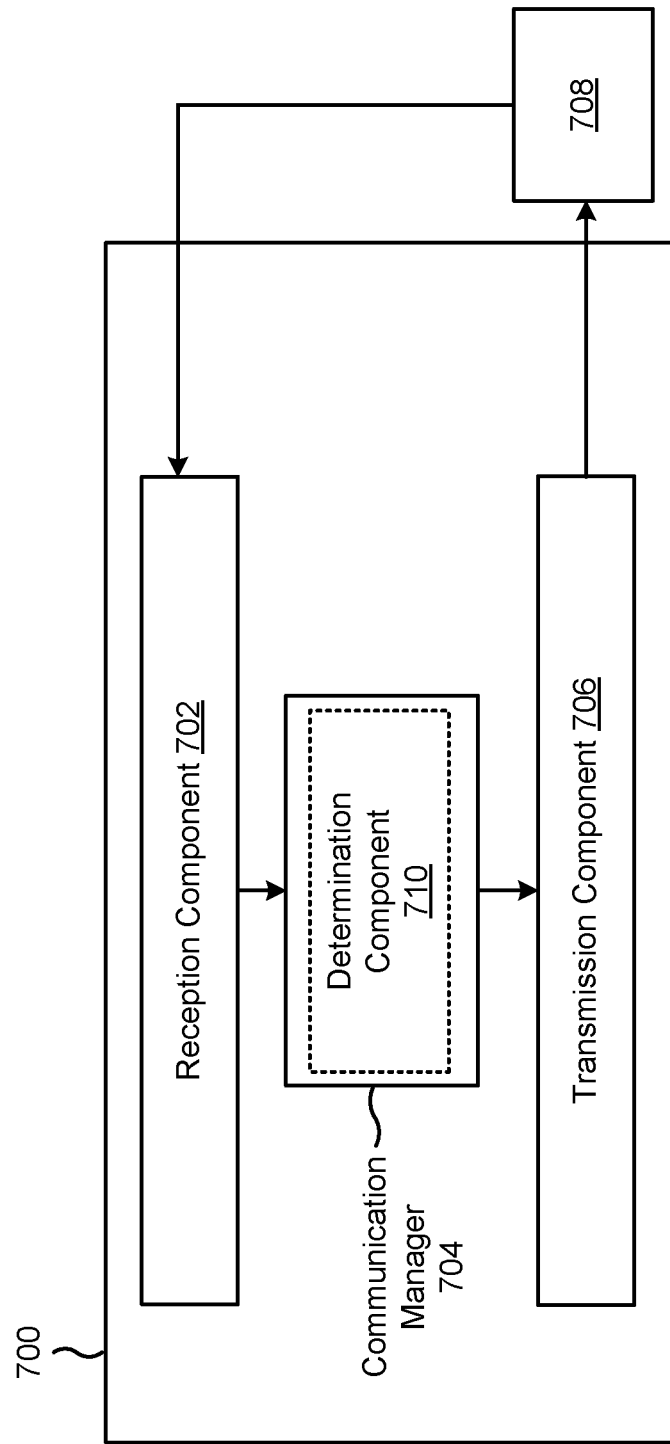
FIGS. 7 and 8 are block diagrams illustrating example apparatuses for wireless communication, in accordance with the present disclosure.

FIG. 7 is a block diagram of an example apparatus 700 for wireless communication in accordance with the present disclosure. The apparatus 700 may be a UE, or a UE may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 4. Additionally or alternatively, the apparatus 700 may be configured to perform one or more processes described herein, such as process 500 of FIG. 5. In some aspects, the apparatus 700 may include one or more components of the UE described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the UE described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the UE described above in connection with FIG. 2. In some aspects, the transmission component 706 may be co-located with the reception component 702 in a transceiver.

The communication manager 704 may transmit or may cause the transmission component 706 to transmit an indication of a quantity of reference signals that the UE supports for measuring CSI within one or more slots. The communication manager 704 may communicate via a wireless connection based at least in part on the indication. For example, the communication manager 704 may receive or may cause the reception component 702 to receive one or more reference signals in a slot of the one or more slots based at least in part on transmitting the indication of the quantity of reference signals. The communication manager 704 may transmit or may cause the transmission component 706 to transmit an indication of one or more measurements of the received one or more reference signals. In some aspects, the communication manager 704 may perform one or more operations described elsewhere herein as being performed by one or more components of the communication manager 704.

The communication manager 704 may include a controller/processor, a memory, or a combination thereof, of the UE described above in connection with FIG. 2. In some aspects, the communication manager 704 includes a set of components, such as a determination component 710. Alternatively, the set of components may be separate and distinct from the communication manager 704. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 706 may transmit an indication of a quantity of reference signals that the UE supports for measuring CSI within one or more slots. The reception component 702 and the transmission component 706 may communicate via a wireless connection based at least in part on the indication. For example, the reception component 702 may receive one or more reference signals in a slot of the one or more slots based at least in part on transmitting the indication of the quantity of reference signals. The transmission component 706 may transmit an indication of one or more measurements of the received one or more reference signals.

The determination component 710 may determine the quantity of reference signals that the UE supports for measuring CSI within one or more slots based at least in part on one or more of: a configuration of the UE, components of the UE, or an operation mode of the UE.

In some aspects, the quantity of reference signals that the UE supports for measuring CSI within one or more slots comprises a maximum quantity of reference signals that the UE supports for measuring CSI within one or more slots.

In some aspects, the one or more measurements comprises a measurement of one or more of: a layer 1 signal-to-interference-plus-noise ratio, or a layer 1 reference signal received power.

In some aspects, the one or more reference signals include one or more of synchronization signal physical broadcast channel blocks or channel state information reference signals.

In some aspects, the channel state information reference signals comprise one or more of: a non-zero-power channel state information reference signal, an aperiodic channel state information reference signal, a periodic channel state information reference signal, or a semi-persistent channel state information reference signal.

In some aspects, the reference signals that the UE supports for CSI measurement include reference signals that the UE supports for CSI measurement on a set of component carriers of a frequency range.

In some aspects, the quantity of reference signals that the UE supports for measuring CSI within one or more slots includes a quantity of reference signals that the UE supports for measuring CSI within one or more slots on a set of component carriers of multiple frequency ranges.

In some aspects, transmitting the indication of the quantity of reference signals that the UE supports for measuring CSI within one or more slots comprises transmitting the indication within a control message.

In some aspects, a numerology of the slot is based at least in part on a particular numerology of a particular bandwidth part of component carriers over which the UE supports the quantity of reference signals.

In some aspects, the particular bandwidth part is a bandwidth part having a smallest numerology among bandwidth parts of the component carriers over which the UE supports the quantity of reference signals.

In some aspects, a numerology of the slot is based at least in part on a configured numerology.

In some aspects, a subcarrier spacing of the slot is based at least in part on a particular subcarrier spacing of a particular bandwidth part of component carriers over which the UE supports the quantity of reference signals.

In some aspects, the particular bandwidth part is a bandwidth part having a largest subcarrier spacing among bandwidth parts of the component carriers over which the UE supports the quantity of reference signals.

In some aspects, a subcarrier spacing of the slot is based at least in part on a configured subcarrier spacing.

The number and arrangement of components shown in FIG. 7 are provided as an example. In practice, there may be additional components, fewer components, different components, or differently arranged components than those shown in FIG. 7.

Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
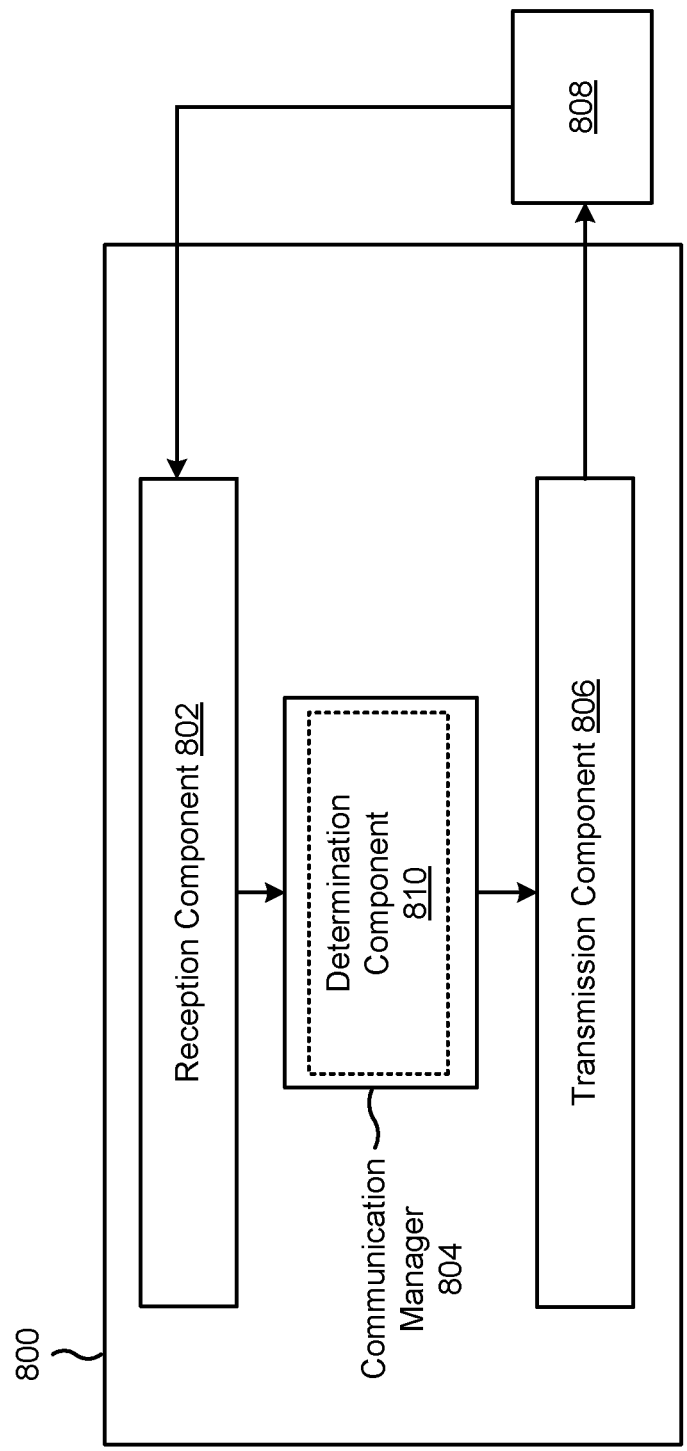

FIG. 8 is a block diagram of an example apparatus 800 for wireless communication in accordance with the present disclosure. The apparatus 800 may be a base station, or a base station may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 may include one or more components of the base station described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the base station described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the base station described above in connection with FIG. 2. In some aspects, the transmission component 806 may be co-located with the reception component 802 in a transceiver.

The communication manager 804 may receive or may cause the reception component 802 to receive an indication of a quantity of reference signals that the UE supports for measuring CSI within one or more slots. The communication manager 804 may communicate via a wireless connection based at least in part on the indication. For example, the communication manager 804 may transmit or may cause the transmission component 806 to transmit one or more reference signals in a slot of the one or more slots based at least in part on receiving the indication of the quantity of reference signals. The communication manager 804 may receive or may cause the reception component 802 to receive an indication of one or more measurements of the received one or more reference signals. In some aspects, the communication manager 804 may perform one or more operations described elsewhere herein as being performed by one or more components of the communication manager 804.

The communication manager 804 may include a controller/processor, a memory, a scheduler, a communication unit, or a combination thereof, of the base station described above in connection with FIG. 2. In some aspects, the communication manager 804 includes a set of components, such as a determination component 810. Alternatively, the set of components may be separate and distinct from the communication manager 804. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive an indication of a quantity of reference signals that the UE supports for measuring CSI within one or more slots. The reception component 802 and the transmission component 806 may communicate via a wireless connection based at least in part on the indication. For example, the transmission component 706 may transmit one or more reference signals in a slot of the one or more slots based at least in part on receiving the indication of the quantity of reference signals. The reception component 702 may receive an indication of one or more measurements of the received one or more reference signals.

The determination component 810 may determine a quantity of reference signals to transmit to the UE for CSI measurement based at least in part on the indication.

In some aspects, the quantity of reference signals that the UE supports for measuring CSI within one or more slots comprises a maximum quantity of reference signals that the UE supports for measuring CSI within one or more slots.

In some aspects, the CSI measurement comprises a measurement of one or more of: a layer 1 signal-to-interference-plus-noise ratio, or a layer 1 reference signal received power.

In some aspects, the reference signals include one or more of synchronization signal physical broadcast channel blocks or channel state information reference signals.

In some aspects, the channel state information reference signals comprise one or more of: a non-zero-power channel state information reference signal, an aperiodic channel state information reference signal, a periodic channel state information reference signal, or a semi-persistent channel state information reference signal.

In some aspects, the reference signals that the UE supports for CSI measurement include reference signals that the UE supports for CSI measurement on a set of component carriers of a frequency range.

In some aspects, the quantity of reference signals that the UE supports for measuring CSI within one or more slots includes a quantity of reference signals that the UE supports for measuring CSI within one or more slots on a set of component carriers of multiple frequency ranges.

In some aspects, receiving the indication of the quantity of reference signals that the UE supports for measuring CSI within one or more slots comprises receiving the indication within a control message.

In some aspects, a numerology of the slot is based at least in part on a particular numerology of a particular bandwidth part of component carriers over which the UE supports the quantity of reference signals.

In some aspects, the particular bandwidth part is a bandwidth part having a smallest numerology among bandwidth parts of the component carriers over which the UE supports the quantity of reference signals.

In some aspects, a numerology of the slot is based at least in part on a configured numerology.

In some aspects, a subcarrier spacing of the slot based at least in part on a particular subcarrier spacing of a particular bandwidth part of component carriers over which the UE supports the quantity of reference signals.

In some aspects, the particular bandwidth part is a bandwidth part having a largest subcarrier spacing among bandwidth parts of the component carriers over which the UE supports the quantity of reference signals.

In some aspects, a subcarrier spacing of the slot is based at least in part on a configured subcarrier spacing.

In some aspects, the quantity of reference signals that the UE supports for measuring CSI within one or more slots is based at least in part on one or more of: a configuration of the UE; components of the UE; or an operation mode of the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
    transmitting an indication of a quantity of reference signal resources, within a slot of a set of component carriers, that the UE supports for performing one or more measurements for beam management in one or more frequency ranges;
    receiving one or more reference signals in the slot of the set of component carriers based at least in part on transmitting the indication of the quantity of reference signal resources; and
    transmitting an indication of the one or more measurements based at least in part on the received one or more reference signals.

2. The method of claim 1, wherein the quantity of reference signal resources comprises a maximum quantity of reference signal resources that the UE supports for reception for performing the one or more measurements.

3. The method of claim 1, wherein the one or more measurements comprise one or more measurements of one or more of:
    a layer 1 signal-to-interference-plus-noise ratio, or
    a layer 1 reference signal received power.

4. The method of claim 1, wherein the one or more reference signals include one or more of synchronization signal physical broadcast channel blocks or channel state information reference signals.

5. The method of claim 4, wherein the channel state information reference signals comprise one or more of:
    a non-zero-power channel state information reference signal,
    an aperiodic channel state information reference signal,
    a periodic channel state information reference signal, or
    a semi-persistent channel state information reference signal.

6. The method of claim 1, wherein the set of component carriers correspond to a frequency range of the one or more frequency ranges.

7. The method of claim 1, wherein the one or more frequency ranges comprises a plurality of frequency ranges.

8. The method of claim 1, wherein transmitting the indication of the quantity of reference signal resources comprises transmitting, within a control message, the indication of the quantity of reference signal resources.

9. The method of claim 1, wherein a numerology of the slot is based at least in part on a particular numerology of a particular bandwidth part of component carriers over which the UE supports the quantity of reference signal resources.

10. The method of claim 9, wherein the particular bandwidth part is a bandwidth part having a smallest numerology among bandwidth parts of the component carriers over which the UE supports the quantity of reference signal resources.

11. The method of claim 1, wherein a numerology of the slot is based at least in part on a configured numerology.

12. The method of claim 1, wherein a subcarrier spacing of the slot is based at least in part on a particular subcarrier spacing of a particular bandwidth part of component carriers over which the UE supports the quantity of reference signal resources.

13. The method of claim 12, wherein the particular bandwidth part is a bandwidth part having a largest subcarrier spacing among bandwidth parts of the component carriers over which the UE supports the quantity of reference signal resources.

14. The method of claim 1, wherein a subcarrier spacing of the slot is based at least in part on a configured subcarrier spacing.

15. The method of claim 1, further comprising determining the quantity of reference signal resources based at least in part on one or more of:
   a configuration of the UE,
   components of the UE, or
   an operation mode of the UE.

16. A user equipment (UE) for wireless communication, comprising:
   one or more memories; and
   one or more processors coupled with the one or more memories, the one or more processors individually or collectively configured to:
      transmit an indication of a quantity of reference signal resources, within a slot of a set of component carriers, that the UE supports for performing one or more measurements for beam management in one or more frequency ranges;
      receive one or more reference signals in the slot of the set of component carriers based at least in part on transmitting the indication of the quantity of reference signal resources; and
      transmit an indication of the one or more measurements based at least in part on the received one or more reference signals.

17. The UE of claim 16, wherein the quantity of reference signal resources comprises a maximum quantity of reference signal resources that the UE supports for reception for performing the one or more measurements.

18. The UE of claim 16, wherein the one or more measurements comprise one or more measurements of one or more of:
   a layer 1 signal-to-interference-plus-noise ratio, or
   a layer 1 reference signal received power.

19. The UE of claim 16, wherein the one or more reference signals include one or more of synchronization signal physical broadcast channel blocks or channel state information reference signals.

20. The UE of claim 19, wherein the channel state information reference signals comprise one or more of:
   a non-zero-power channel state information reference signal,
   an aperiodic channel state information reference signal,
   a periodic channel state information reference signal, or
   a semi-persistent channel state information reference signal.

21. The UE of claim 16, wherein the set of component carriers correspond to a frequency range of the one or more frequency ranges.

22. The UE of claim 16, wherein the one or more frequency ranges comprises a plurality of frequency ranges.

23. The UE of claim 16, wherein the one or more processors, when transmitting the indication of the quantity of reference signal resources, are configured to transmit, within a control message, the indication of the quantity of reference signal resources.

24. The UE of claim 16, wherein a numerology of the slot is based at least in part on a particular numerology of a particular bandwidth part of component carriers over which the UE supports the quantity of reference signal resources.

25. The UE of claim 24, wherein the particular bandwidth part is a bandwidth part having a smallest numerology among bandwidth parts of the component carriers over which the UE supports the quantity of reference signal resources.

26. The UE of claim 16, wherein a numerology of the slot is based at least in part on a configured numerology.

27. The UE of claim 16, wherein a subcarrier spacing of the slot is based at least in part on a particular subcarrier spacing of a particular bandwidth part of component carriers over which the UE supports the quantity of reference signal resources.

28. The UE of claim 27, wherein the particular bandwidth part is a bandwidth part having a largest subcarrier spacing among bandwidth parts of the component carriers over which the UE supports the quantity of reference signal resources.

29. The UE of claim 16, wherein a subcarrier spacing of the slot is based at least in part on a configured subcarrier spacing.

30. The UE of claim 16, wherein the one or more processors are further configured to determine the quantity of reference signal resources based at least in part on one or more of:
   a configuration of the UE;
   components of the UE; or
   an operation mode of the UE.

* * * * *